US012458890B2

United States Patent
(12) United States Patent
Wang et al.

(10) Patent No.: US 12,458,890 B2
(45) Date of Patent: Nov. 4, 2025

(54) METHOD AND APPARATUS FOR CONTROLLING PUT OF VIRTUAL RESOURCE, COMPUTER DEVICE, AND STORAGE MEDIUM

(71) Applicant: NETEASE (HANGZHOU) NETWORK CO., LTD., Zhejiang (CN)

(72) Inventors: Xin Wang, Zhejiang (CN); Shuang Liu, Zhejiang (CN)

(73) Assignee: NETEASE (HANGZHOU) NETWORK CO., LTD., Hangzhou (CN)

( * ) Notice: Subject to any disclaimer, the term of this patent is extended or adjusted under 35 U.S.C. 154(b) by 100 days.

(21) Appl. No.: 18/548,226

(22) PCT Filed: Mar. 21, 2022

(86) PCT No.: PCT/CN2022/082121
§ 371 (c)(1),
(2) Date: Aug. 29, 2023

(87) PCT Pub. No.: WO2023/005234
PCT Pub. Date: Feb. 2, 2023

(65) Prior Publication Data

US 2024/0131434 A1 Apr. 25, 2024
US 2024/0226745 A9 Jul. 11, 2024

(30) Foreign Application Priority Data

Jul. 30, 2021 (CN) ......................... 202110872438.9

(51) Int. Cl.
*A63F 13/57* (2014.01)
*A63F 13/2145* (2014.01)
(Continued)

(52) U.S. Cl.
CPC .......... *A63F 13/57* (2014.09); *A63F 13/2145* (2014.09); *A63F 13/5258* (2014.09); *A63F 13/537* (2014.09); *A63F 2300/308* (2013.01)

(58) Field of Classification Search
CPC ........ A63F 13/22; A63F 13/42; A63F 13/426; A63F 13/44; A63F 13/45; A63F 13/50;
(Continued)

(56) References Cited

U.S. PATENT DOCUMENTS 11,036,984 B1 * 6/2021 Patangay .............. G06V 20/20
2007/0129148 A1 * 6/2007 Van Luchene .......... G07F 17/32
463/1
(Continued)

FOREIGN PATENT DOCUMENTS

CN 111249731 A 6/2020
CN 111773718 A 10/2020
(Continued)

OTHER PUBLICATIONS

Japanese Office Action issued in corresponding Japanese Patent Application No. 2023-552232 dated Dec. 23, 2024, pp. 1-8.
(Continued)

*Primary Examiner* — Omkar A Deodhar
(74) *Attorney, Agent, or Firm* — PV IP PC; Wei Te Chung

(57) ABSTRACT

A method, and an apparatus for controlling put of a virtual resource and a computer device, and a storage-medium are disclosed in the disclosure. When a game player wants to put a target virtual resource at a target put position in a first virtual scene, a reference put position may be set. A terminal may determine the target put position in the first virtual scene based on the reference put position, and directly put the target virtual resource at the target put position.

20 Claims, 5 Drawing Sheets

(51) Int. Cl.
*A63F 13/5258* (2014.01)
*A63F 13/537* (2014.01)

(58) Field of Classification Search
CPC ...... A63F 13/52; A63F 13/57; A63F 13/2145; A63F 13/5258; A63F 13/537; A63F 13/70; A63F 13/79; A63F 2300/308; A63F 2300/55; A63F 2300/554; A63F 2300/60; A63F 2300/6081; A63F 2300/65; A63F 2300/66
See application file for complete search history.

(56) References Cited

U.S. PATENT DOCUMENTS

| | | | | |
|---|---|---|---|---|
| 2009/0198664 | A1* | 8/2009 | Hamilton, II | A63F 13/30 |
| 2013/0296045 | A1* | 11/2013 | Dun | A63F 13/35 463/31 |
| 2018/0345148 | A1 | 12/2018 | Matsumiya et al. | |
| 2019/0111335 | A1* | 4/2019 | Miao | A63F 13/95 |
| 2019/0134511 | A1* | 5/2019 | Degarmo | A63F 13/352 |
| 2019/0213023 | A1* | 7/2019 | Wang | G06F 16/2365 |
| 2021/0370175 | A1* | 12/2021 | Sato | A63F 13/5258 |

FOREIGN PATENT DOCUMENTS

| | | | |
|---|---|---|---|
| CN | 111773721 | A | 10/2020 |
| CN | 111803937 | A | 10/2020 |
| CN | 112870715 | A | 6/2021 |
| CN | 113041622 | A | 6/2021 |
| CN | 113082712 | A | 7/2021 |
| CN | 113546422 | A | 10/2021 |
| JP | 2008229159 | A | 10/2008 |
| JP | 2018202128 | A | 12/2018 |
| JP | 2022549455 | A | 11/2022 |
| WO | 2019148941 | A1 | 8/2019 |
| WO | 2020168863 | A1 | 8/2020 |

OTHER PUBLICATIONS https://www.youtube.com/watch?v=LXgA7Sia0bU Date: May 22, 2021.
https://www.youtube.com/watch?v=ks3qjSvgm6w Date: Jan. 3, 2020.
https://xn--88j6euf4gsct400au65dhli4qv.com/%E8%8D%92%E9%87%8E%E8%A1%8C%E5%8B%95%E3%81%AE%E6%94%BB%E7%95%A5%EF%BC%81%EF%BC%81%E5%88%9D%E5%BF%83%E8%80%85%E3%81%AF%E3%81%BE%E3%81%9A%E3%81%93%E3%81%86%E3%81%97%E3%82%8D%EF%BC%81%EF%BC%81/ Date: Mar. 8, 2018.
Chinese Office Action issued in corresponding Chinese Patent Application No. 202110872438.9 dated Dec. 26, 2023, pp. 1-7.
Japanese Office Action issued in corresponding Japanese Patent Application No. 2023-552232 dated Jul. 11, 2024, pp. 1-54.
https://xn--88j6euf4gsct400au65dhli4qv.com/%E8%8D%92%E9%87%8E%E8%A1%8C%E5%8B%95%E3%81%AE%E6%94%BB%E7%95%A5%EF%BC%81%EF%BC%81%E5%88%9D%E5%BF%83%E8%80%85%E3%81%AF%E3%81%BE%E3%81%9A%E3%81%93%E3%81%86%E3%81%97%E3%82%8D%EF%BC%81%EF%BC%81/ Date: Jun. 26, 2018.
https://www.youtube.com/watch?v=AmDJSeQuvOg Year: 2017.
https://kamigame.jp/COD%E3%83%A2%E3%83%90%E3%82%A4%E3%83%AB/index.html Date: Oct. 20, 2022.
International Search Report in International application No. PCT/CN2022/082121,mailed on Jun. 23, 2022.
Written Opinion of the International Search Authority in International application No. PCT/CN2022/082121,,mailed on Jun. 23, 2022.

* cited by examiner

METHOD AND APPARATUS FOR CONTROLLING PUT OF VIRTUAL RESOURCE, COMPUTER DEVICE, AND STORAGE MEDIUM

This application is the US national phase application of PCT International Application No. PCT/CN2022/082121, filed on Mar. 21, 2022, which is based on and claims priority to Chinese Patent Application No. 202110872438.9, filed on Jul. 30, 2021 and entitled "METHOD AND APPARATUS FOR CONTROLLING PUT OF VIRTUAL RESOURCE, COMPUTER DEVICE, AND STORAGE MEDIUM", the entire contents of both of which are is incorporated by reference herein for all purposes.

TECHNICAL FIELD

The present disclosure relates to game technology, and more particularly, to a method, and an apparatus for controlling put of a virtual resource, a computer device and a storage-medium.

BACKGROUND

With the development of science and technology, electronic games running on an electronic device platform, such as a first person shooting game, a third person shooting game, or the like, have become an important activity for people to enjoy entertainment. In order to increase the fun of a game, use of a virtual resource such as a virtual prop and/or a virtual skill is an important way of playing an electronic game, such as putting a smoke bomb, a hand grenade, or the like in a virtual scene of the electronic game.

SUMMARY

Technical Problem

Embodiments of the present disclosure provide methods and apparatuses for controlling put of a virtual resource, computer devices, and storage media, which may enable a player in a game to put a target virtual resource accurately at a position in a virtual scene.

Technical Solutions

According to a first aspect, an embodiment of the present disclosure provides a method for controlling put of a virtual resource comprising:

displaying a first virtual scene and a virtual object located in the first virtual scene by a graphical user interface, wherein the virtual object is configured to perform a game behavior in response to a touch operation on the graphical user interface;

displaying a second virtual scene and a resource indicator located in the second virtual scene by the graphical user interface in response to an enable trigger operation for a target virtual resource, wherein the resource indicator is configured to visually indicate a put position for the target virtual resource;

controlling the resource indicator to move in the second virtual scene, in response to a movement operation for the resource indicator;

determining a reference put position of the resource indicator in the second virtual scene, in response to a position confirmation instruction for the resource indicator; and determining a target put position for the target virtual resource in the first virtual scene according to the reference put position, and putting the target virtual resource at the target put position in the first virtual scene.

According to a second aspect, an embodiment of the present disclosure provides an apparatus for controlling put of a virtual resource comprising:

a first display unit configured to display the first virtual scene and the virtual object located in the first virtual scene by the graphical user interface, and the virtual object is configured to perform a game behavior in response to the touch operation on the graphical user interface;

a second display unit configured to display the second virtual scene and the resource indicator located in the second virtual scene by the graphical user interface in response to the enable trigger operation for the target virtual resource, wherein the resource indicator is used to visually indicate a placement position of the target virtual resource;

a movement unit configured to control the resource indicator to move in the second virtual scene in response to the movement operation for the resource indicator;

a determination unit configured to determine the reference put position of the resource indicator in the second virtual scene in response to the position confirmation instruction for the resource indicator; and a put unit configured to determine a target put position for the target virtual resource in the first virtual scene according to the reference put position, and put the target virtual resource at the target put position in the first virtual scene.

According to a third aspect, an embodiment of the present disclosure provides a computer device including: a processor; and a memory storing a computer program executable by the processor to perform the above method.

According to a fourth aspect, an embodiment of the present disclosure provides a non-transitory storage medium storing a computer program executable by a processor to perform the above method.

Beneficial Effect

Embodiments of the present disclosure provide methods and apparatuses for controlling put of a virtual resource, computer devices, and storage media. When a player wants to put the target virtual resource at a target put position in a first virtual scene, he/she makes an enable trigger operation of the target virtual resource, and moves a resource indicator in a second virtual scene that appears until the target virtual resource is moved to a reference put position in the second virtual scene corresponding to the target put position. A terminal determines the target put position in the first virtual scene according to the reference put position, and puts the target virtual resource directly at the target put position. The player puts the target virtual resource accurately at the target put position in a game scene, thereby reducing skill requirements for the player to put the virtual resource.

DETAILED DESCRIPTIONS

Figure 1:
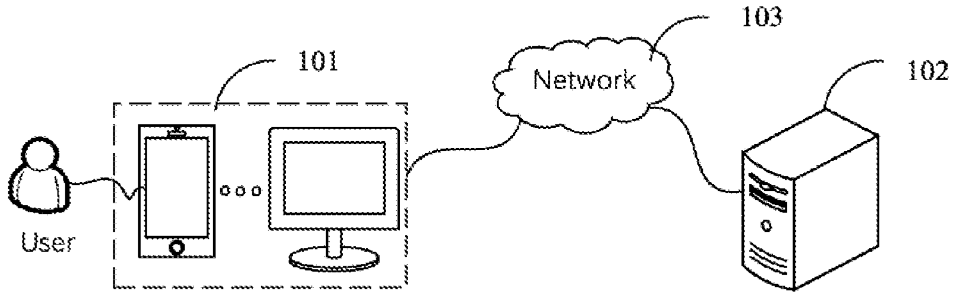
FIG. 1 is a schematic view of a system where apparatus for controlling put of a virtual resource is located according to an embodiment of the present disclosure.

Technical solutions in embodiments of the present disclosure will be clearly and completely described below in conjunction with accompanying drawings in the embodiments of the present disclosure. It will be apparent that the described embodiments are merely part of, but not all of, the embodiments of the present disclosure. All other embodiments obtained by those skilled in the art without creative work, based on the embodiments of the present disclosure, fall within the protection scope of the present disclosure.

In the electronic game, there is a high requirement for a player to put a virtual resource, and it is difficult for a player to put the virtual resource accurately at a certain position in a game scene.

An embodiment of the present disclosure provides methods and apparatuses for controlling put of a virtual resource, computer devices, and storage media. Specifically, a method for controlling the put of the virtual resource according to an embodiment of the present disclosure may be executed by a computer device, which may be a terminal, a server, or the like. The terminal may be a terminal apparatus such as a smartphone, a tablet computer, a notebook computer, a touch screen, a game machine, a personal computer (PC), a personal digital assistant (PDA), or the like. The terminal may further include a client, which may be a game application client, a browser client carrying a game program, an instant messaging client, or the like. The server may be a separate physical server, may be a server cluster or a distributed system composed of multiple physical servers, or may be a cloud server for providing basic cloud computing services such as cloud services, cloud databases, cloud computing, cloud functions, cloud storage, network services, cloud communications, middleware services, domain name services, security services, content distribution network services, and big data and artificial intelligence platforms.

For example, when the method for controlling the put of virtual resources is operated in the terminal, the terminal apparatus stores a game application program and is configured to present a virtual scene in a graphical user interface. For example, the virtual scene is displayed in the graphical user interface by downloading and installing the game application program through the terminal apparatus and executing it. The manner in which the terminal apparatus provides the virtual scene to the user may include a variety of ways. For example, the virtual scene may be rendered for display on a display screen of the terminal apparatus, or rendered by holographic projection. For example, the terminal apparatus may include a touch display screen configured to present the virtual scene and receive an operation instruction generated by the user operating on the graphical user interface, and a processor configured to run a game, generate a game screen, respond to the operation instruction, and control the graphical user interface and the virtual scene to be displayed on the touch display screen.

For example, when the method for controlling the put of the virtual resource runs on the server, it may be a cloud game. The cloud games is based on cloud computing. In an operation mode of the cloud game, an operation subject of the game application program and the game screen presentation subject are separated. Storage and operation of the method for controlling the put of the virtual resource are performed on the cloud game server. A game screen presentation is at a cloud game client. The cloud game client is mainly configured to receive, send and present game data. For example, a cloud game client may be a display apparatus having a data transmission function near a user side, such as a mobile terminal, a television, a computer, a palmtop computer, a personal digital assistant, or the like. A terminal apparatus for processing the game data is a cloud game server on a cloud side. When the game is played, the user operates the cloud game client, so as to send an operation instruction to the cloud game server. The cloud game server runs the game, encodes and compresses the data such as the game screen, returns the data to the cloud game client through the network, and finally decodes and outputs the game screen through the cloud game client, according to the operation instruction.

FIG. 1 is a schematic view of a system where apparatus for controlling put of a virtual resource is located according to an embodiment of the present disclosure; The system may include at least one terminal 101 and at least one game server 102. The user-held terminal 101 may be connected to game servers 102 for different games through different networks 103, for example, a wireless network or a wired network. The wireless network may be a wireless local area network (WLAN), a local area network (LAN), a cellular network, a 2G network, a 3G network, a 4G network, a 5G network, or the like. The terminal may be configured to display a first virtual scene and a virtual object located in the first virtual scene by a graphical user interface. The virtual object is configured to perform a game behavior in response to a touch operation on the graphical user interface; display a second virtual scene and a resource indicator located in the second virtual scene by the graphical user interface in response to an enable trigger operation for a target virtual resource, wherein the resource indicator is configured to visually indicate a put position for the target virtual resource; control the resource indicator to move in the second virtual scene, in response to a movement operation for the resource indicator; determine a reference put position of the resource indicator in the second virtual scene, in response to a position confirmation instruction for the resource indicator; determine a target put position for the target virtual resource in the first virtual scene according to the reference put position, and put the target virtual resource at the target put position in the first virtual scene.

The game server is configured to transmit a graphical user interface to the terminal.

These are explained in detail below, respectively. It should be noted that the description order of the following embodiments is not intended to limit the preferred order of the embodiments.

The present embodiment will be described in terms of an apparatus for controlling the put of the virtual resource, which may be specifically integrated in a terminal apparatus. The terminal apparatus may include apparatuses such as a smartphone, a notebook computer, a tablet computer, a personal computer, or the like.

Figure 2:
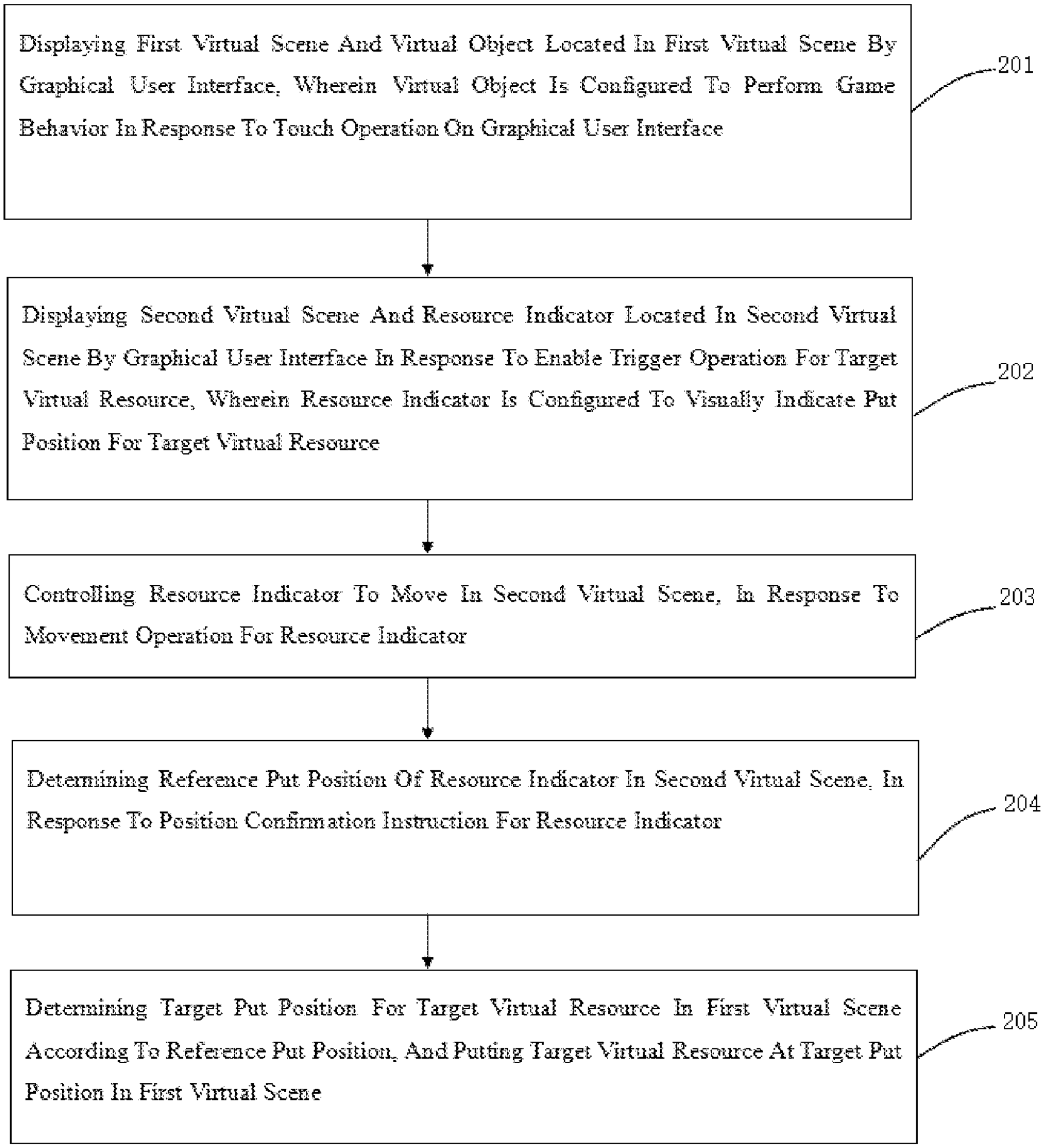
FIG. 2 is a schematic flowchart of a method for controlling put of a virtual resource according to an embodiment of the present disclosure.

An embodiment of the present disclosure provides a method for controlling the put of the virtual resource. The method may be executed by a terminal processor, as shown in FIG. 2. The method for controlling the put of the virtual resource mainly includes Steps 201 to 205, which are described in detail as follows:

Step 201: displaying a first virtual scene and a virtual object located in the first virtual scene by a graphical user interface, wherein the virtual object is configured to perform a game behavior in response to a touch operation on the graphical user interface.

Figure 3:
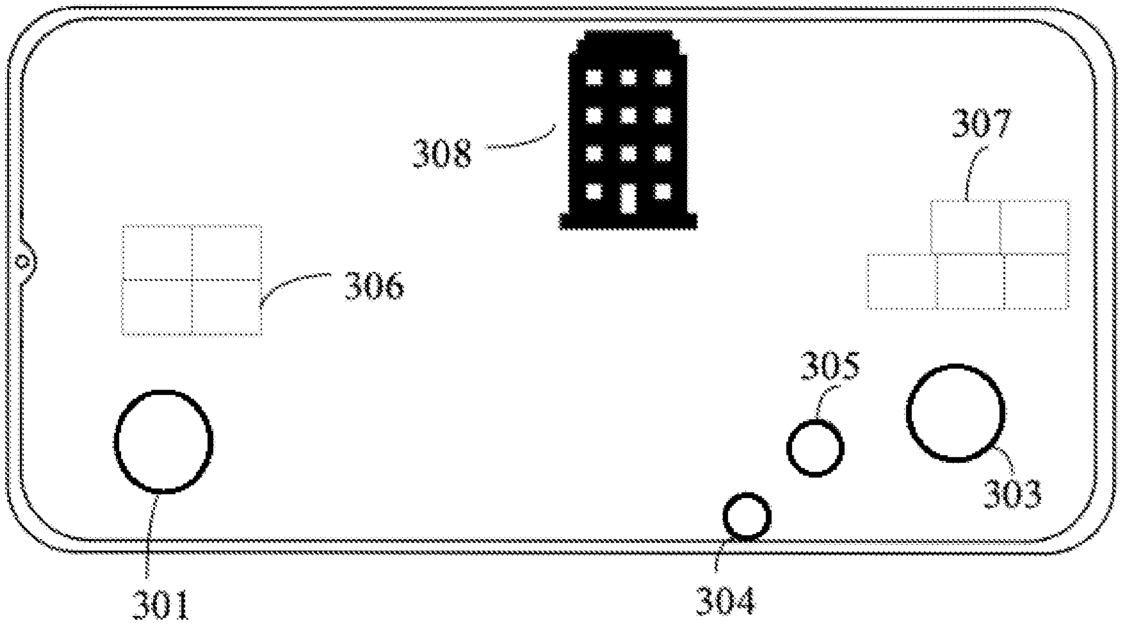
FIG. 3 is a schematic view of a graphical user interface displaying a first virtual scene according to an embodiment of the present disclosure.

In an embodiment of the present disclosure, the graphical user interface displaying the first virtual scene is a game screen displayed on a display screen of the terminal after the terminal executes a game application program. The first virtual scene of the graphical user interface displaying the first virtual scene may have a game prop, and/or a plurality of virtual objects or the like (buildings, trees, mountains, or the like) constituting or included in a game world environment. A placement of a virtual object such as a building, a mountain, a wall, or the like in the first virtual scene constitutes a spatial layout of the first virtual scene. Further, a game corresponding to the game application program may be a first-person shooter, a multiplayer online role-playing game, or the like. For example, as shown in FIG. 3, in a schematic view of the graphical user interface displaying the first virtual scene may include a virtual building 308, an obstacle 306 composed of four virtual containers, and an obstacle 307 composed of five containers. The graphical user interface displaying the first virtual scene may further include a movement control element 301 configured to control the movement of the virtual object, a resource control 305 configured to trigger an enable trigger operation for a target virtual resource, an attack control element 303 configured to control the virtual object to attack, and other skill control elements 304.

In an embodiment of the present disclosure, the virtual object may be a game character operated by a player through the game application program. For example, the virtual object may be a virtual character (such as a simulated character or an animated character), a virtual animal, or the like. The game behavior of the virtual object in the first virtual scene includes, but is not limited to, at least one of adjusting body posture, crawling, walking, running, riding, flying, jumping, driving, picking, shooting, attacking, putting, releasing a skill.

Step 202: displaying a second virtual scene and a resource indicator located in the second virtual scene by the graphical user interface in response to an enable trigger operation for the target virtual resource, wherein the resource indicator is configured to visually indicate a put position for the target virtual resource.

In an embodiment of the present disclosure, in order to facilitate the player to control a virtual object to carry out a remote attack against an enemy at a distance, a virtual resource may be set in a game. The virtual resource may include props and skills. The virtual resource may be a resource to be put, such as a cluster bomb, a cluster missile, a smoke bomb, or the like. The player may control the virtual object to put the cluster bomb at a certain place within a field of view, so that a plurality of successive explosions occur within a range selected by the player, and a large number of players may be quickly defeated. The virtual resource may be directly put by the virtual object or may be put by the virtual carrier.

In an embodiment of the present disclosure, the enable trigger operation of the target virtual resource is an operation required when the virtual object uses the target virtual resource in the virtual scene. The enable trigger operations for different virtual resources may be the same or different. The enable trigger operation may be an operation such as a click, a long press, a double, and/or a click, etc.

In an embodiment of the present disclosure, the graphical user interface displaying the first virtual scene may include a resource triggering control element. When the player performs a touch operation on the resource triggering control element, the enable trigger operation of the target virtual resource may be triggered. In addition, different virtual resources may correspond to the same resource trigger control element, or may correspond to different resource trigger control elements.

In an embodiment of the present disclosure, when the player performs the enable trigger operation, a second virtual scene is displayed. The second virtual scene has a scene layout corresponding to the first virtual scene, and may be all virtual entities in the first virtual scene that are imitated by the virtual simulation entity, such as a building, a wall, a mountain, or the like. The layout of each virtual simulation entity in the second virtual scene is the same as the layout of a corresponding virtual entity in the first virtual scene. In addition, a shape of the virtual simulation entity in the second virtual scene is the same as a shape of a corresponding virtual entity in the first virtual scene. However, the surface of the virtual entity in the first virtual scene has the same color, texture, or the like as a corresponding object in the real life. The virtual simulation entity in the second virtual scene does not have the color, texture, or the like of the simulated virtual entity. The second virtual scene is formed according to the virtual simulation entity. A relative position relationship of respective virtual simulation entities in the second virtual scene is the same as a relative position relationship of respective virtual entities in the first virtual scene. A size of each virtual simulation entity in the second virtual scene may be the same as that of a corresponding virtual entity in the first virtual scene, or may be scaled down or up in proportion to a corresponding virtual entity in the first virtual scene.

In an embodiment of the present disclosure, the second virtual scene includes a second scene element. The second scene element is configured to characterize a first scene element in at least a portion of the first virtual scene. A position of the second scene element in the second virtual scene is configured to characterize a position of the first scene element in the first virtual scene. That is, the second scene element corresponds one-to-one to the first scene element, the position of each second scene element in the second virtual scene is the same as the position of a corresponding first scene element in the first virtual scene, and each second scene element has the same attribute (such as shape, size, or the like) as a corresponding first scene element. The first scene element and the second scene element may be a virtual building, a virtual wall, a virtual river, or the like in a virtual scene.

In an embodiment of the present disclosure, a display range of the second virtual scene in the graphical user interface is bound to the resource indicator. When the resource indicator moves in the second virtual scene, the display range of the second virtual scene in the graphical user interface varies as the resource indicator moves. Therefore, the method further includes determining the display range of the second virtual scene in the graphical user interface according to a position of the resource indicator in the second virtual scene.

In an embodiment of the present disclosure, since the display range of the second virtual scene in the graphical user interface varies as the resource indicator moves in the second virtual scene, it is necessary to determine an initial display range in the second virtual scene before the above-mentioned step "displaying the second virtual scene and the resource indicator located in the second virtual scene by the graphical user interface". Specifically, the initial display range of the second virtual scene in the graphical user interface is determined according to a position of the virtual object in the first virtual scene on occurrence of the enable trigger operation.

In an implement of the present disclosure, "displaying the second virtual scene by the graphical user interface" in the above step may include hiding the first virtual scene in the graphical user interface, to trigger display of the second virtual scene in the graphical user interface.

In an embodiment of the present disclosure, the second virtual scene may not be a new virtual scene independent of the first virtual scene, but is formed by simplifying the first virtual scene. Specifically, the second virtual scene may include the first virtual scene with a preset virtual object hidden. The preset virtual object includes one or more of a player virtual character, a non-player virtual character, and/or a virtual prop object. The player virtual character may be a virtual object currently operated by the current player and/or the player virtual character operated by other players involved in the game. The non-player virtual character may be a non-player virtual character operated by the terminal and not operated by the players involved in the game. The virtual prop object may be a virtual object in the game that has an auxiliary effect on the player virtual character, for example, an attacking weapon, a riding ride, or the like.

In an embodiment of the present disclosure, the first virtual scene and the second virtual scene may be simultaneously displayed in a graphical user interface. In this case, the step of "displaying the second virtual scene by the graphical user interface" may include: determining, in the graphical user interface displaying the first virtual scene, a second display area of an area range smaller than that of the graphical user interface; and displaying the second virtual scene by the second display area. In addition, a position, a size, or the like of the second display area in the graphical user interface are not limited, and can be flexibly set according to actual conditions.

In an embodiment of the present disclosure, the resource indicator is configured to indicate a reference put position for the target virtual resource in the second virtual scene. The resource indicator may be the same in shape and size as the target virtual resource, or may be different in shape and size from the target virtual resource.

In an embodiment of the present disclosure, the graphical user interface displaying the first virtual scene includes a virtual object located in the first virtual scene. The graphical user interface displaying the second virtual scene may not include a virtual object located in the second virtual scene. Therefore, a position of an enemy virtual object may be seen in the second virtual scene when the target put position (or target dispensing position) of the target virtual resource is set through the resource indicator, thereby ensuring fairness of a game.

Figure 4:
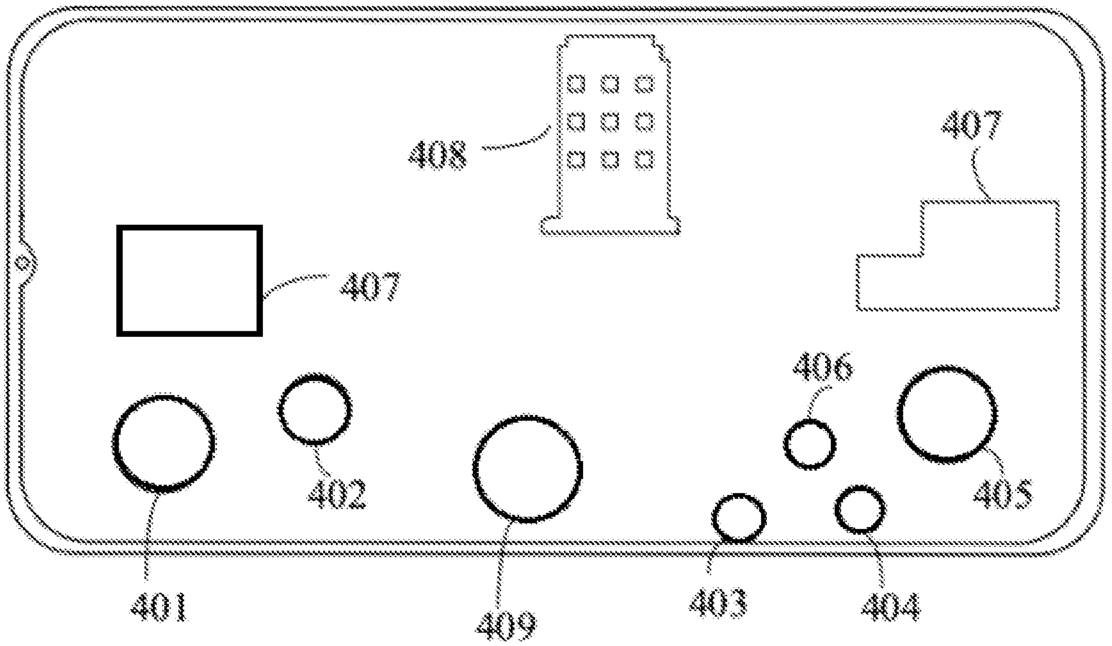
FIG. 4 is a schematic view of a graphical user interface displaying a second virtual scene displayed in response to an enable trigger operation according to an embodiment of the present disclosure.

For example, as shown in FIG. 4, in a schematic diagram of the graphical user interface displaying the second virtual scene displayed in response to the enable trigger operation, the second virtual scene may include a virtual simulation entity 408 formed according to a virtual building 308, a virtual simulation entity 407 generated according to an obstacle 306, a virtual simulation entity 407 generated according to an obstacle 307, and a resource indicator 409. The graphical user interface displaying the second virtual scene further includes a horizontal movement control element 401 configured to control the resource indicator 409 to move horizontally in the second virtual scene, a vertical movement control element 403 and a vertical movement control element 404 configured to control the resource indicator 409 to move vertically in the second virtual scene, a resource control 406 configured to trigger the enable trigger operation of the target virtual resource, a cancellation control element 402 configured to cancel current put for the target virtual resource, and a position determination control element 405 configured to determine that a position determination instruction is generated.

Step 203: controlling the resource indicator to move in the second virtual scene, in response to a movement operation for the resource indicator.

In an embodiment of the present disclosure, the player may move the resource indicator by operating a move control. The graphical user interface displaying the second virtual scene includes a move control configured to control the resource indicator to move in the second virtual scene. The move control includes a horizontal movement control element and a vertical movement control element. In this case, in the above Step 203 of "controlling the resource indicator to move in the second virtual scene in response to the movement operation for the resource indicator" may include:

controlling the resource indicator to move in a horizontal direction in the second virtual scene in response to a first touch operation on the horizontal movement control element; and controlling the resource indicator to move in a vertical direction in the second virtual scene in response to a second touch operation on the vertical movement control element.

In an embodiment of the present disclosure, an object movement control element for controlling the virtual object to move in the first virtual scene may be included in the graphical user interface displaying the first virtual scene. After the graphical user interface displaying the second virtual scene is displayed in response to the enable trigger operation for the target virtual resource, the object movement control element in the graphical user interface displaying the first virtual scene may be changed into a movement control element for moving the resource indicator, so that only the resource indicator may move but the virtual object may not move after the second virtual scene is generated.

In an embodiment of the present disclosure, the player may further move the resource indicator by directly dragging a resource indicator on the terminal screen with a finger or a mouse indication cursor. In this case, the movement operation includes a drag operation. The above-mentioned Step 203 of "controlling the resource indicator to move in the second virtual scene, in response to the movement operation for the resource indicator" may include:

controlling the resource indicator to move in the second virtual scene in response to the drag operation for the resource indicator in the second virtual scene.

In an embodiment of the present disclosure, in order to better determine a final reference put position of the resource indicator in the second virtual scene according to a spatial layout of the second virtual scene, a change in the second virtual scene may be displayed as the resource indicator moves. In this case, after the Step 203 of "controlling the resource indicator to move in the second virtual scene, in response to the movement operation for the resource indicator", the method may further include: displaying a transition clip including a second virtual scene that transforms as the resource indicator moves.

In an embodiment of the present disclosure, when the player triggers the movement operation for the resource indicator, the resource indicator moves in the second virtual scene. Before the player performs the movement operation for the resource indicator, it is necessary to determine the position of the resource indicator in the initial display range of the second virtual scene. Specifically, an initial position of the resource indicator in the second virtual scene is determined according to the position and/or orientation of the virtual object in the first virtual scene on occurrence of the enable trigger operation.

In an embodiment of the present disclosure, the terminal may load the first virtual scene and the second virtual scene at the same time during a process of running the game. The first virtual scene is displayed on the graphical user interface before the player carries on the enable trigger operation. The terminal may hide the first virtual scene in the graphical user interface and display the second virtual scene in the graphical user interface, when the player carries on the enable trigger operation for the target virtual resource. When determining the initial position of the resource indicator in the initial display range of the second virtual scene, the terminal may first obtain a spatial coordinate (x, y, z) of the virtual object in the first virtual scene. After the second virtual scene is displayed in the graphical user interface, the terminal may determine a spatial coordinate of the reference put point of the resource indicator in the second virtual scene, which may be obtained by combining the spatial coordinates (x, y, z) of the virtual object in the first virtual scene, and the offsets (xd, yd, zd) of the first virtual scene and the second virtual scene, that is, the initial position of the resource indicator (x1, y1, z1)=(x, y, z)+(xd, yd, zd). Then, the player operates the resource indicator in the second virtual scene. The offsets of the first virtual scene and the second virtual scene may be set as 0, or may be flexibly set according to actual conditions.

Step 204: determining a reference put position of the resource indicator in the second virtual scene, in response to a position confirmation instruction for the resource indicator.

In an embodiment of the present disclosure, in order for the player to better place the target virtual resource at a position that is effective for an actual game situation according to the actual game situation, the resource indicator may include a reference put point and a simulated enable shape for simulating a rendered shape of the target virtual resource enabled on a basis of the reference put point when the target virtual resource is at respective positions in the first virtual scene. Therefore, a rendering effect scene after the target virtual resource is enabled may be viewed by the player in the second virtual according to the resource indicator. Further, the reference put position of the resource indicator in the second virtual scene may be adjusted according to the influence of the rendering effect of the resource indicator on the actual game situation. In this case, the above step 204 of "determining the reference put position of the resource indicator in the second virtual scene, in response to the position determination instruction for the resource indicator" may include:

obtaining the spatial layout of the second virtual scene during movement of the resource indicator;

determining a rendering range of the simulated enable shape of the resource indicator according to the spatial layout of the second virtual scene;

in response to a position confirmation instruction for the resource indicator, obtaining a reference rendering range of the simulated enable shape, and a height and a ground projection coordinate of the reference put point in the second virtual scene;

determining a position of the reference put point in the second virtual scene according to the height and the ground projection coordinate; and determining the reference put position of the resource indicator in the second virtual scene, according to the position of the reference put point in the second virtual scene and the reference rendering range of the simulated enable shape.

In an embodiment of the present disclosure, during the movement of the resource indicator, as the spatial layout of the second virtual scene varies, the height of the resource indicator in the second virtual scene varies, or the like, the rendering range of the simulated enable shape of the resource indicator changes. For example, when the target virtual resource is a smoke bomb, a smoke rendering range after the smoke bomb is enabled may change with the wall in the first virtual environment, the height of the put point of the smoke bomb in the first virtual scene, or the like. Therefore, in order to better enable the target virtual resource to have more beneficial effects on the actual game situation in the first virtual scene, it is necessary to determine the reference put position of the resource indicator in the second virtual scene according to the simulated enable shape and the reference put point of the resource indicator.

In an embodiment of the present disclosure, the number of target virtual resources put at one target put position varies, and the target rendering ranges after the target virtual resources are enabled varies. Therefore, the rendering range of the simulated enable shape of the resource indicator in the second virtual scene may also be determined according to the set number of target virtual resources. In this case, before the step of "determining a shape of the simulated enable shape of the resource indicator according to the spatial layout of the second virtual scene", the method further includes: determining the number of puts of the target virtual resources in response to the number setting operation of the target virtual resource. After determining the number of the puts of the target virtual resources at the target put position, the above step of "determining the rendering range of the simulated enable shape of the resource indicator according to the spatial layout of the second virtual scene" may include: determining the rendering range of the simulated enable shape of the resource indicator according to the number of puts of the target virtual resources and the spatial layout of the second virtual scene.

In an embodiment of the present disclosure, in order to enable the player to control the virtual object operated by the player to attack with other hostile virtual objects, an attack control element for instructing the virtual object to launch an attack in the first virtual scene may be provided in the graphical user interface displaying the first virtual scene.

During the determination of the reference put position of the resource indicator in the second virtual scene, there may not be other hostile virtual resources in the second virtual scene for the sake of fairness of the game, and the attack control element in the graphical user interface displaying the first virtual scene is ineffectiveness at this time. In order to simplify the setting of icons of the graphical user interface displaying the second virtual scene, the attack control element may be converted to the position determination control element for the resource indicator. At this time, the step of "determining the reference put position of the resource indicator in the second virtual scene, in response to the position confirmation instruction for the resource indicator" further includes: converting the attack control element into the position determination control element for the resource indicator; and in response to the touch operation on the position determination control element, generating the position confirmation instruction for the resource indicator.

Figure 5:
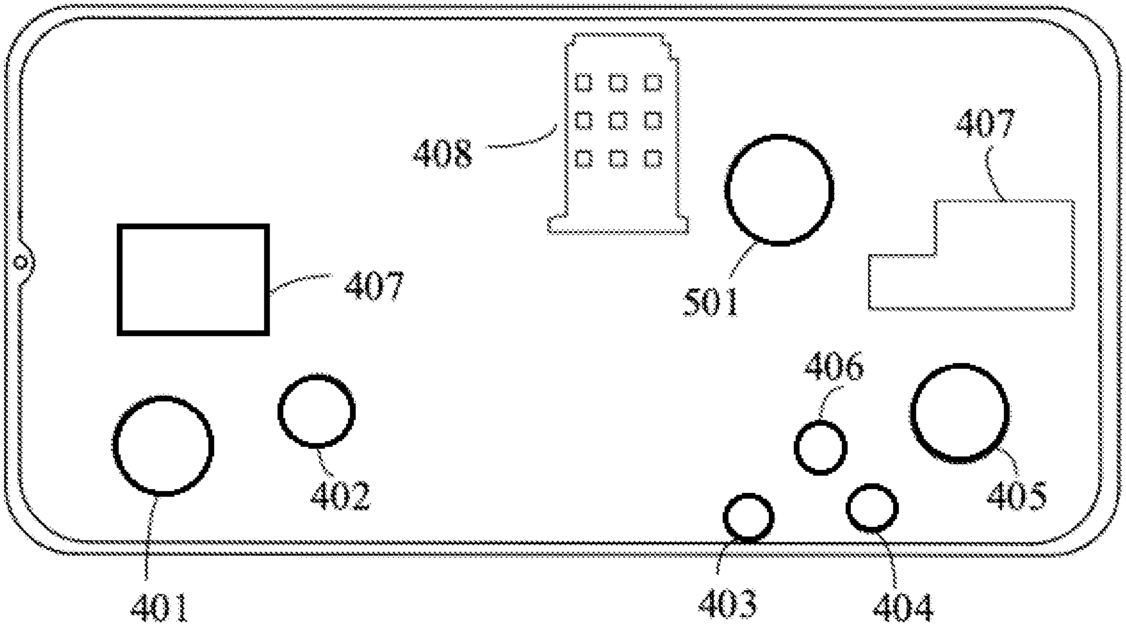
FIG. 5 is a schematic view of a reference put position in a second virtual scene according to an embodiment of the present disclosure.

For example, in the schematic view of the reference put position in the second virtual scene as shown in FIG. 5, when the resource indicator stops moving in the second virtual scene, the reference put position of the resource indicator in the second virtual scene is a position in which the resource indicator 501 is located as shown in FIG. 5.

Step 205: determining a target put position for the target virtual resource in the first virtual scene according to the reference put position, and putting the target virtual resource at the target put position in the first virtual scene.

In an embodiment of the present disclosure, the target virtual resource includes a target put point and a target enable shape, and the target enable shape includes a rendering shape of the target virtual resource enabled at the target put point.

In an embodiment of the present disclosure, switching the graphical user interface displaying the second virtual scene to the graphical user interface displaying the first virtual scene.

After the simulated enable shape and the put position of the reference put point of the resource indicator are determined in the second virtual scene, the above-mentioned step "determining the target put position for the target virtual resource in the first virtual scene according to the reference put position" may include:

- obtaining spatial position correspondence between the first virtual scene and the second virtual scene;
- determining a position corresponding to the reference put point in the first virtual scene according to the reference put position and the spatial position correspondence, as the target put point;
- determining a rendering range corresponding to the simulated enable shape in the first virtual scene according to the reference put position and the spatial position correspondence, as a target rendering range of the target enable shape; and
- determining the target put position for the target virtual resource in the first virtual scene according to the target put point and the target rendering range.

Figure 6:
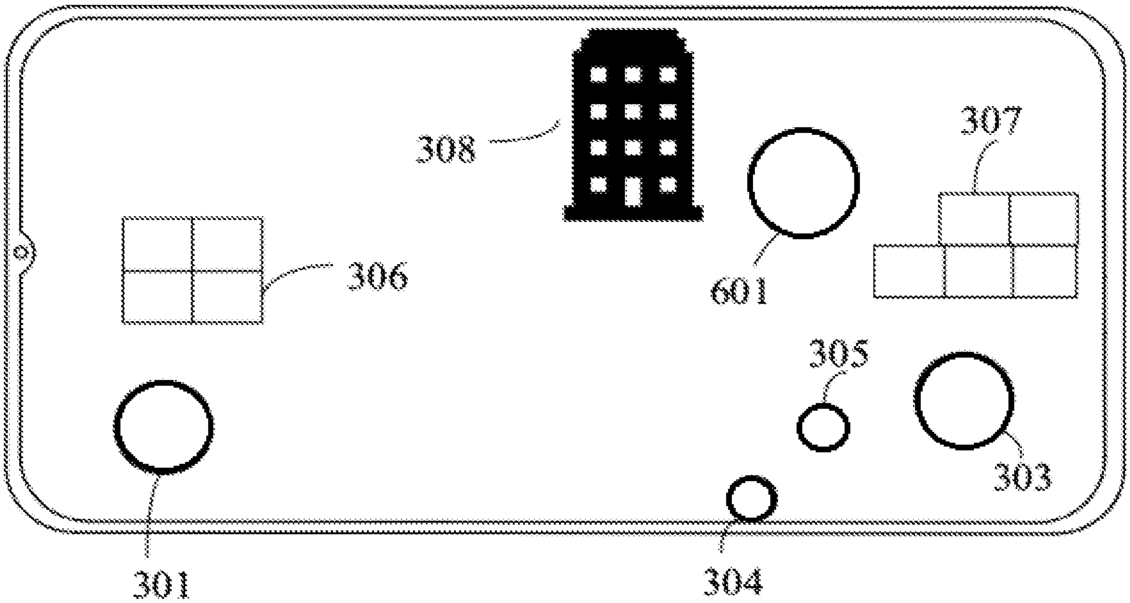
FIG. 6 is a schematic view of putting a target virtual resource in a first virtual scene according to an embodiment of the present disclosure.

In an embodiment of the present disclosure, the spatial position correspondence is a correspondence between respective spatial points of the first virtual scene and respective spatial points of the second virtual scene. Determining a rendering range corresponding to the simulated enable shape in the first virtual scene may include determining a key point(s) constituting the simulated enable shape, or determining, in the first virtual scene, a point(s) corresponding to all points constituting the simulated enable shape. The target rendering range of the target virtual resource is determined in the first virtual scene according to the determined corresponding key point(s). For example, as shown in FIG. 6, which is a schematic view of putting a target virtual resource in a first virtual scene, a target put position 601 of the target virtual resource is determined in the first virtual scene as shown in FIG. 6 according to a reference put position and a reference rendering range of the resource indicator 501 as shown in FIG. 5.

In an embodiment of the present disclosure, after the target put point of the target virtual resource in the first virtual scene is determined, and the target rendering range generated when the target virtual resource is enabled at the target put point, the target rendering range after the target virtual resource is enabled may be directly rendered at the target put position.

In an embodiment of the present disclosure, the put of the target virtual resource in the first virtual scene may be cancelled after the player triggers the enable trigger operation of the target virtual resource and before the reference put position of the resource indicator is determined. Specifically, the prop cancellation area is displayed in response to the enable trigger operation for the target virtual resource, and the graphical user interface displaying the second virtual scene is converted into the graphical user interface displaying the first virtual scene in response to a trigger operation on the prop cancellation area.

In an embodiment of the present disclosure, a display position and a display shape of the prop cancellation area in the graphical user interface displaying the second virtual scene may be set flexibly according to actual conditions, and it is not limited.

In an embodiment of the present disclosure, when the graphical user interface including the second virtual scene and displaying the second virtual scene is displayed in response to the enable trigger operation for the target virtual resource, a plurality of resource indicators may be generated in the second virtual scene at one time, respective resource indicators may be moved, and after a reference put position of every resource indicator is determined, the position determination instruction is generated, so that the target put positions of the plurality of target virtual resources are determined at one time, and the target virtual resource is put at and enabled at the plurality of target put positions.

Any combination of the above technical solutions may be used to form an alternative embodiment of the present disclosure, and details are not described herein.

In a method for controlling the put of the virtual resource according to an embodiment of the present disclosure, when the player wants to put the target virtual resource at the target put position in the first virtual scene, he/she may make the enable trigger operation of the target virtual resource, and then move the resource indicator in the second virtual scene having the same spatial layout as the first virtual scene until the target virtual resource is moved to the reference put position in the second virtual scene corresponding to the first virtual scene, so that the terminal may determine the target put position in the first virtual scene according to the reference put position, and put the target virtual resource directly at the target put position. Therefore, the player may put the target virtual resource accurately to the target put position in the game scene, thereby reducing a skill requirement for the player to put the virtual resource.

Figure 7:
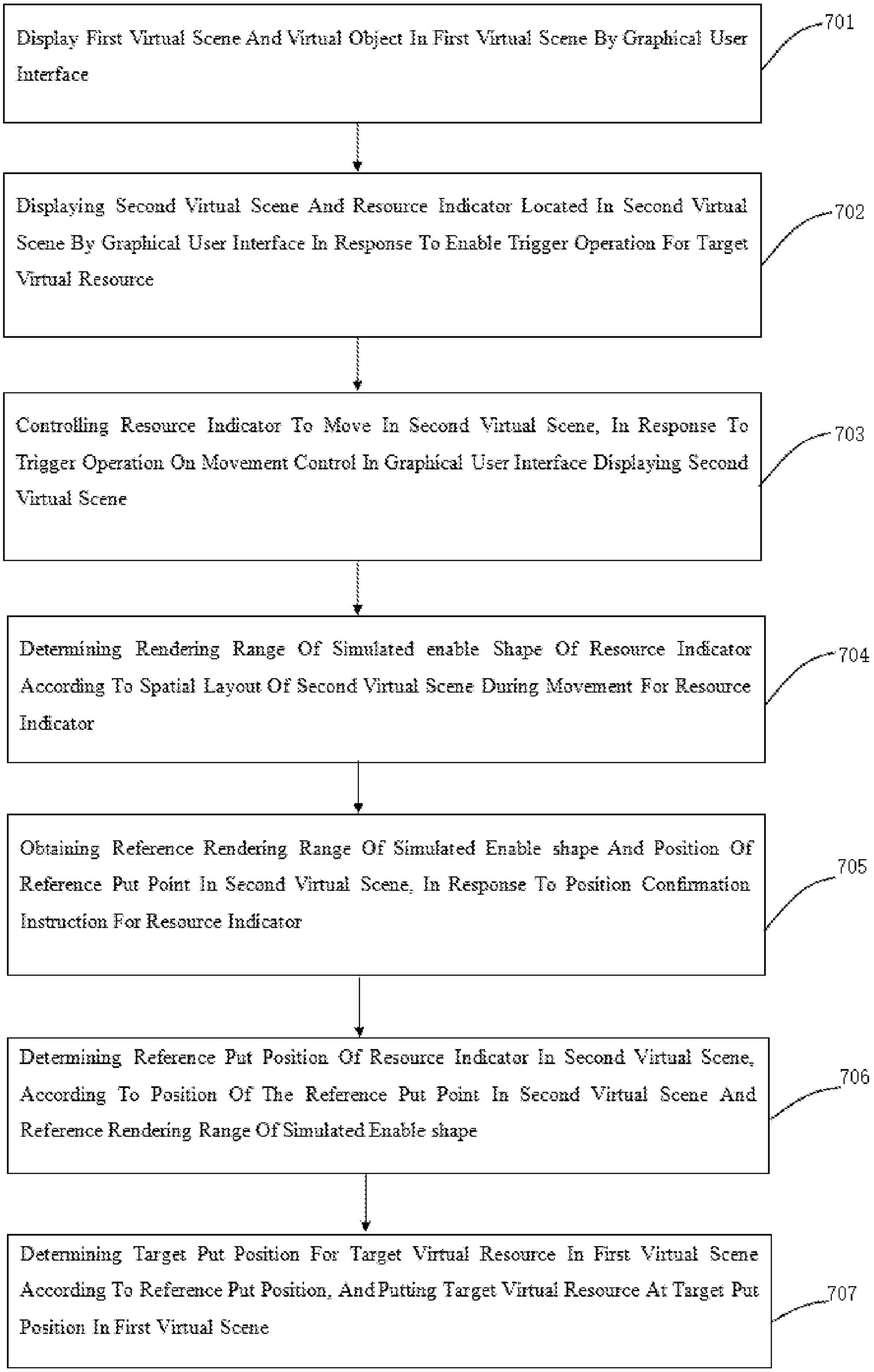
FIG. 7 is schematic flowchart of a method for controlling put of a virtual resource according to another embodiment of the present disclosure.

Referring to FIG. 7, FIG. 7 is a schematic flowchart of a method for controlling the put of the virtual resource according to another embodiment of the present disclosure. The method may include:

Step 701: display the first virtual scene and the virtual object in the first virtual scene by the graphical user interface.

For example, the graphical user interface displaying the first virtual scene is a game screen displayed on the display screen of the terminal after the terminal executes the game application program. The first virtual scene of the graphical user interface displaying the first virtual scene may have the game prop, and/or the plurality of virtual objects or the like (buildings, trees, mountains, or the like) constituting or included in a game world environment. The placement of the virtual object such as a building, a mountain, a wall, or the like in the first virtual scene constitutes the spatial layout of the first virtual scene.

Step 702: displaying the second virtual scene and the resource indicator located in the second virtual scene by the graphical user interface in response to the enable trigger operation for the target virtual resource.

For example, when the player performs the enable trigger operation, the second virtual scene may be obtained by the simplification of the first virtual scene, so that the second virtual scene is displayed.

Step 703: controlling the resource indicator to move in the second virtual scene, in response to the trigger operation on the movement control element in the graphical user interface displaying the second virtual scene.

For example, the movement control element includes the horizontal movement control element and the vertical movement control element. The resource indicator is moved in the horizontal direction of the second virtual scene in response to a first touch operation on the horizontal movement control element. The resource indicator is moved in the vertical direction of the second virtual scene in response to a second touch operation on the vertical movement control element.

Step 704: determining the rendering range of the simulated enable shape of the resource indicator according to the spatial layout of the second virtual scene during the movement of the resource indicator.

For example, in the process of moving the resource indicator by touching the movement control element, the spatial layout of the second virtual scene is obtained in real time. The rendering range of the simulated enable shape of the resource indicator is determined according to the spatial layout of the second virtual scene.

Step 705: obtaining the reference rendering range of the simulated enable shape and the position of the reference put point in the second virtual scene, in response to the position confirmation instruction for the resource indicator.

For example, in response to the position confirmation instruction for the resource indicator, the reference rendering range of the simulated enable shape, and the height and the ground projection coordinate of the reference put point in the second virtual scene are obtained. The position of the reference put point in the second virtual scene is determined according to the height and the ground projection coordinate.

Step 706: determining the reference put position of the resource indicator in the second virtual scene, according to the position of the reference put point in the second virtual scene and the reference rendering range of the simulated enable shape.

Step 707: determining the target put position for the target virtual resource in the first virtual scene according to the reference put position, and putting the target virtual resource at the target put position in the first virtual scene.

For example, the spatial position correspondence between the first virtual scene and the second virtual scene is obtained. The graphical user interface displaying the second virtual scene is switched into the graphical user interface displaying the first virtual scene. The target put position for the target virtual resource is determined in the first virtual scene according to the spatial position correspondence and the reference put position, and the target virtual resource is put at the target put position in the first virtual scene.

Any combination of the above technical solutions may be used to form an alternative embodiment of the present disclosure, and details are not described herein.

In a method for controlling the put of virtual resources according to an embodiment of the present disclosure, when the player wants to put the target virtual resource at the target put position in the first virtual scene, he/she may make the enable trigger operation of the target virtual resource, and then move the resource indicator in the second virtual scene having the same spatial layout as the first virtual scene until the target virtual resource is moved to the reference put position in the second virtual scene corresponding to the first virtual scene, so that the terminal may determine the target put position in the first virtual scene according to the reference put position, and put the target virtual resource directly at the target put position. Therefore, the player may put the target virtual resource accurately at the target put position in the game scene, thereby reducing a skill requirement for the player to put the virtual resource.

Figure 8:
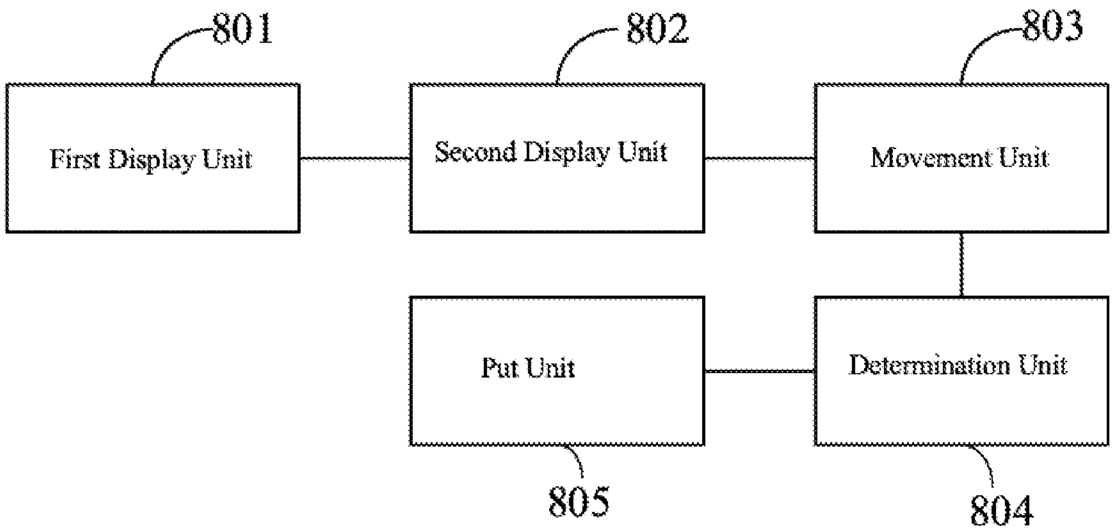
FIG. 8 is a schematic block diagram of apparatus for controlling put of a virtual resource according to an embodiment of the present disclosure.

To facilitate better implementation of the method for controlling the put of the virtual resource according to an embodiment of the present disclosure, the present embodiment of the present disclosure further provides an apparatus for controlling the put of the virtual resource. Referring to FIG. 8, FIG. 8 is a schematic block diagram of the apparatus for controlling the put of the virtual resource according to an embodiment of the present disclosure. The apparatus for controlling the put of the virtual resource may include a first display unit 801, a second display unit 802, a movement unit 803, a determination unit 804, and a put unit 805.

The first display unit 801 is configured to display the first virtual scene and the virtual object located in the first virtual scene by the graphical user interface, and the virtual object is configured to perform a game behavior in response to the touch operation on the graphical user interface.

The second display unit 802 is configured to display the second virtual scene and the resource indicator located in the second virtual scene by the graphical user interface in response to the enable trigger operation for the target virtual resource, wherein the resource indicator is used to visually indicate a placement position of the target virtual resource.

The movement unit 803 is configured to control the resource indicator to move in the second virtual scene in response to the movement operation for the resource indicator.

The determination unit 804 is configured to determine the reference put position of the resource indicator in the second virtual scene in response to the position confirmation instruction for the resource indicator.

The put unit 805 is configured to determine a target put position for the target virtual resource in the first virtual scene according to the reference put position, and put the target virtual resource at the target put position in the first virtual scene.

Alternatively, the second virtual scene has the scene layout corresponding to the first virtual scene.

Alternatively, the second virtual scene includes the second scene element. The second scene element is configured to characterize the first scene element in at least a portion of the first virtual scene. A position of the second scene element in the second virtual scene is configured to characterize a position of the first scene element in the first virtual scene.

Alternatively, the apparatus further includes:

determining the display range of the second virtual scene in the graphical user interface according to the position of the resource indicator in the second virtual scene.

Alternatively, the second display unit 802 is further configured to:

determine the initial display range of the second virtual scene in the graphical user interface according to the position of the virtual object in the first virtual scene on occurrence of the enable trigger operation.

Alternatively, the second display unit 802 is further configured to:

determine the initial position of the resource indicator in the second virtual scene according to a position and/or orientation of the virtual object in the first virtual scene on occurrence of the enable trigger operation.

Alternatively, the second display unit 802 is further configured to:

hide the first virtual scene in the graphical user interface, and trigger the display of the second virtual scene in the graphical user interface.

Alternatively, the second virtual scene includes a first virtual scene with the preset virtual object hidden. The preset virtual object includes one or more of the player virtual character, a non-player virtual character, and/or a virtual prop object.

Alternatively, the second display unit 802 is further configured to:

determine, in the graphical user interface displaying the first virtual scene, the second display area of the area range smaller than that of the graphical user interface; and display the second virtual scene by the second display area.

Alternatively, the graphical user interface displaying the second virtual scene includes the movement control element for controlling the resource indicator to move in the second virtual scene. The movement control element includes a horizontal movement control element and a vertical movement control element. The movement unit 803 is further configured to:

control the resource indicator to move in the horizontal direction in the second virtual scene in response to the first touch operation on the horizontal movement control element; and control the resource indicator to move in the vertical direction in the second virtual scene in response to the second touch operation on the vertical movement control element.

Alternatively, the movement operation includes the drag operation, and the movement unit 803 is further configured to:

control the resource indicator to move in the second virtual scene in response to the drag operation for the resource indicator in the second virtual scene.

Alternatively, the movement unit 803 is further configured to:

display the transition clip including the second virtual scene that transforms as the resource indicator moves.

Alternatively, the resource indicator includes the reference put point and the simulated enable shape for simulating the rendered shape of the target virtual resource enabled on a basis of the reference put point when the target virtual resource is at respective positions in the first virtual scene. The determining unit 804 is further configured to:

obtain the spatial layout of the second virtual scene during movement of the resource indicator;

determine the rendering range of the simulated enable shape of the resource indicator according to the spatial layout of the second virtual scene;

obtain the reference rendering range of the simulated enable shape, and the height and the ground projection coordinate of the reference put point in the second virtual scene, in response to the position confirmation instruction for the resource indicator;

determine the position of the reference put point in the second virtual scene according to the height and the ground projection coordinate; and determine the reference put position of the resource indicator in the second virtual scene, according to the position of the reference put point in the second virtual scene and the reference rendering range of the simulated enable shape.

Alternatively, the determining unit 804 is further configured to:

determine the number of puts of the target virtual resources in response to the number setting operation of the target virtual resource;

determine the rendering range of the simulated enable shape of the resource indicator according to the number of the puts of the target virtual resources and the spatial layout of the second virtual scene.

Alternatively, the target virtual resource includes a target put point and a target enable shape, and the target enable shape includes the rendering shape of the target virtual resource enabled at the target put point. The put unit 805 is further configured to:

obtain the spatial position correspondence between the first virtual scene and the second virtual scene;

determine the position corresponding to the reference put point in the first virtual scene according to the reference put position and the spatial position correspondence, as the target put point;

determine the rendering range corresponding to the simulated enable shape in the first virtual scene according to the reference put position and the spatial position correspondence, as a target rendering range of the target enable shape; and determine the target put position for the target virtual resource in the first virtual scene according to the target put point and the target rendering range.

Alternatively, the apparatus is further configured to:

display the prop cancellation area in response to the enable trigger operation for the target virtual resource; and display the first virtual scene in response to the trigger operation on the prop cancellation area.

Alternatively, the graphical user interface displaying the first virtual scene includes an attack control element for instructing the virtual object to launch an attack in the first virtual scene. The determination unit 804 is further configured to:

convert the attack control element into the position determination control element for the resource indicator; and in response to the touch operation on the position determination control element, generating the position confirmation instruction for the resource indicator.

Any combination of the above technical solutions may be used to form an alternative embodiment of the present disclosure, and details are not described herein.

In an apparatus for controlling the put of the virtual resource according to an embodiment of the present disclosure, when the player wants to put the target virtual resource at the target put position in the first virtual scene, he/she may make the enable trigger operation of the target virtual resource, and then move the resource indicator in the second virtual scene having the same spatial layout as the first virtual scene until the target virtual resource is moved to the reference put position in the second virtual scene corresponding to the first virtual scene, so that the terminal may determine the target put position in the first virtual scene according to the reference put position, and put the target virtual resource directly at the target put position. Therefore, the player may put the target virtual resource accurately at the target put position in the game scene, thereby reducing a skill requirement for the player to put the virtual resource.

Figure 9:
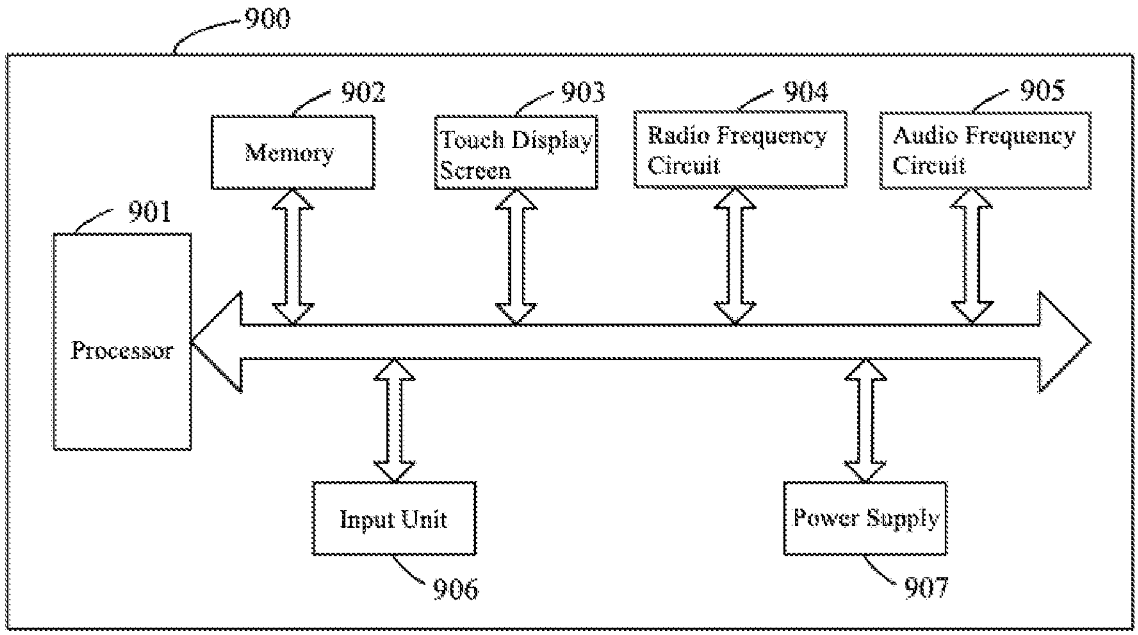
FIG. 9 is a schematic block diagram of a computer device according to an embodiment of the present disclosure.

Accordingly, an embodiment of the present disclosure further provides a computer device. The computer device may be a terminal, and the terminal may be a terminal apparatus such as a smartphone, a tablet computer, a notebook computer, a touch screen, a game machine, a personal computer, a personal digital assistant, or the like. As shown in FIG. 9, FIG. 9 is a schematic block diagram of a computer device according to an embodiment of the present disclosure. The computer device 900 includes a processor 901 having one or more processing cores, a memory 902 having one or more computer-readable storage-media, and a computer program stored on the memory 902 and runnable on the processor. The processor 901 is electrically connected to the memory 902. It will be appreciated by those skilled in the art that the structure of the computer device illustrated in the figures is not intended to limit the computer device, and may include more or less components than illustrated, or may combine certain components, or different component arrangements.

The processor 901 is a control center of the computer device 900, connected to various portions of the entire computer device 900 by various interfaces and lines, and performs various functions of the computer device 900 and processes data by running or loading software programs and/or modules stored in the memory 902 and invoking data stored in the memory 902, thereby monitoring the entire computer device 900.

In an embodiment of the present disclosure, the processor 901 in the computer device 900 loads instructions corresponding to the processes of the one or more application programs into the memory 902 according to the following steps, wherein the application programs stored in the memory 902 are run by the processor 901, thereby implementing various functions:

displaying the first virtual scene and the virtual object located in the first virtual scene by a graphical user interface, wherein the virtual object is configured to perform the game behavior in response to the touch operation on the graphical user interface; displaying the second virtual scene and the resource indicator located in the second virtual scene by the graphical user interface in response to the enable trigger operation for the target virtual resource, wherein the resource indicator is configured to visually indicate the put position for the target virtual resource; controlling the resource indicator to move in the second virtual scene, in response to the movement operation for the resource indicator; determining the reference put position of the resource indicator in the second virtual scene, in response to the position determination instruction for the resource indicator; and determining the target put position for the target virtual resource in the first virtual scene according to the reference put position, and putting the target virtual resource at the target put position in the first virtual scene.

Reference may be made to the previous embodiments for specific implementations of the above respective operations, and details are not described herein.

Alternatively, as shown in FIG. 9, the computer device 900 further includes a touch display screen 903, a radio frequency circuit 904, an audio frequency circuit 905, an input unit 906, and a power supply 907. The processor 901 is electrically connected to the touch display screen 903, the radio frequency circuit 904, the audio frequency circuit 905, the input unit 906, and the power supply 907, respectively. It will be appreciated by those skilled in the art that the structure of the computer device shown in FIG. 9 does not constitute a limitation on the computer device, and may include more or less components than illustrated, or may combine certain components, or different component arrangements.

The touch screen 903 may be configured to display the graphical user interface and to receive an operation instruction generated by the user operating on the graphical user interface. The touch display screen 903 may include a display panel and a touch panel. The display panel may be configured to display information input by or provided to a user and various graphical user interfaces of the computer device, and these graphical user interfaces may be composed of graphics, text, icons, videos, and any combination thereof. Alternatively, the display panel may be configured in the form of a liquid crystal display (LCD), an organic light-emitting Diode (OLED), or the like. The touch panel may be used to collect a touch operation (such as an operation of the user on or near the touch panel by using any suitable object or accessory such as a finger, a stylus, etc.) of the user on or near the touch panel, and generate a corresponding operation instruction. The operation instruction executes a corresponding program. Alternatively, the touch panel may include both a touch detection device and a touch controller. the touch detection devices detect a touch orientation of the user, detects a signal caused by the touch operation, and transmits the signal to the touch controller. The touch controller receives touch information from the touch detection device and converts the touch information into contact coordinates, then sends the contact coordinates to the processor 901, and may receive and execute commands sent from the processor 901. The touch panel may cover the display panel. When the touch panel detects a touch operation on or near the touch panel, the touch panel transmits the touch operation to the processor 901 to determine a type of a touch event. The processor 901 provides a corresponding visual output on the display panel according to the type of the touch event. In the present embodiment of the present disclosure, the touch panel and the display panel may be integrated to the touch display screen 903 to implement input and output functions. However, in some embodiments, the touch panel and the display panel may be implemented as two separate components to implement input and output functions. That is, the touch display screen 903 may implement an input function as part of the input unit 906.

The radio frequency circuit 904 may be configured to transmit and receive radio frequency signals to establish wireless communication with a network apparatus or other computer device through wireless communication, and to transmit and receive signals between the network device or other computer device.

The audio circuit 905 may be configured to provide an audio interface between the user and the computer device through a speaker, microphone. The audio circuit 905 may transmit an electrical signal converted from a received audio data to the speaker, and convert the electrical signal into a sound signal to be output by the speaker. On the other hand, the microphone converts the collected sound signal into an electrical signal. The electrical signal is received by the audio circuit 905 and converted into audio data, and the audio data is then processed by the audio data output processor 901, and then transmitted to, for example, another computer device via the radio frequency circuit 904, or the audio data is output to the memory 902 for further processing. The audio circuit 905 may also include an earplug jack, to provide communication between the peripheral headset and the computer device.

The input unit 906 may be configured to receive input numbers, character information, or user characteristic information (e.g., fingerprints, iris, face information, etc.), and to generate keyboard, mouse, joystick, or optical or trackball signal input related to user settings and functional control.

The power supply 907 is configured to power various components of computer device 900. Alternatively, the power supply 907 may be logically connected to the processor 901 through a power management system, so that functions such as charging, discharging, power consumption management, or the like are managed through the power management system. The power supply 907 may also include one or more DC or AC power supplies, a recharging system, a power failure detection circuit, a power converter or inverter, a power status indicator, or any other component.

Although not shown in FIG. 9, the computer device 900 may further include a camera, a sensor, a wireless fidelity module, a Bluetooth module, or the like, and details are not described herein.

In the above-mentioned embodiments, the description of respective one of the embodiments has its own emphasis, and parts not described in detail in a certain embodiment may be referred to the related description of other embodiments.

As can be seen from the above, For the computer device according to the present embodiment, when the player wants to put the target virtual resource at the target put position in the first virtual scene, he/she may make the enable trigger operation of the target virtual resource, and then move the resource indicator in the second virtual scene having the same spatial layout as the first virtual scene until the target virtual resource is moved to the reference put position in the second virtual scene corresponding to the first virtual scene, so that the terminal may determine the target put position in the first virtual scene according to the reference put position, and put the target virtual resource directly at the target put position. Therefore, the player may put the target virtual resource accurately at the target put position in the game scene, thereby reducing a skill requirement for the player to put the virtual resource.

It will be appreciated by those of ordinary skill in the art that all or a portion of the steps of the various methods of the above-described embodiments may be performed by instructions, or a hardware related to instruction control. The instructions may be stored in a computer-readable storage-medium and loaded and executed by a processor.

To this end, an embodiment of the present disclosure provides a computer readable storage-medium in which a plurality of computer programs are stored. The computer programs are loaded by the processor, to perform the steps in any of the methods for controlling the put of virtual resources according to embodiments of the present disclosure. For example, the computer program may perform the following steps:

displaying the first virtual scene and the virtual object located in the first virtual scene by a graphical user interface, wherein the virtual object is configured to perform the game behavior in response to the touch operation on the graphical user interface; displaying the second virtual scene and the resource indicator located in the second virtual scene by the graphical user interface in response to the enable trigger operation for the target virtual resource, wherein the resource indicator is configured to visually indicate the put position for the target virtual resource; controlling the resource indicator to move in the second virtual scene, in response to the movement operation for the resource indicator; determining the reference put position of the resource indicator in the second virtual scene, in response to the position determination instruction for the resource indicator; and determining the target put position for the target virtual resource in the first virtual scene according to the reference put position, and putting the target virtual resource at the target put position in the first virtual scene.

Reference may be made to the previous embodiments for specific implementations of the above respective operations, and details are not described herein.

The storage-medium may include a read only memory (ROM), a random access memory (RAM), a magnetic disk, an optical disk, or the like.

Since the computer program stored in the storage-medium may perform the steps in any of the methods for controlling the put of virtual resources according to embodiments of the present disclosure. Therefore, the advantageous effects that may be achieved in any of the methods for controlling the put of virtual resources according to embodiments of the present disclosure may be realized. For details, refer to the foregoing embodiments, and details are not described herein.

In the above-mentioned embodiments, the description of respective one of the embodiments has its own emphasis, and parts not described in detail in a certain embodiment may be referred to the related description of other embodiments.

The above describes in detail a method, an apparatus, a computer device, and storage-medium for controlling the put of virtual resources according to embodiments of the present disclosure. The principles and embodiments of the present disclosure are set forth herein by using specific examples. The description of the above embodiments is merely intended to help understand the technical solution and the core idea of the present disclosure. It will be appreciated by those of ordinary skill in the art that modifications may still be made to the technical solutions described in the foregoing embodiments, or equivalents may be made to a portion of the technical features therein. These modifications or substitutions do not depart the essence of the corresponding technical solution from the scope of the technical solutions of the various embodiments of the present disclosure.

What is claimed is:

1. A method for controlling put of a virtual resource, comprising:

displaying a first virtual scene and a virtual object located in the first virtual scene by a graphical user interface, wherein the virtual object is configured to perform a game behavior in response to a touch operation on the graphical user interface;

displaying a second virtual scene and a resource indicator located in the second virtual scene by the graphical user interface, in response to an enable trigger operation for a target virtual resource, wherein the resource indicator is configured to visually indicate a put position for the target virtual resource;

controlling the resource indicator to move in the second virtual scene, in response to a movement operation for the resource indicator;

determining a reference put position of the resource indicator in the second virtual scene, in response to a position confirmation instruction for the resource indicator; and determining a target put position for the target virtual resource in the first virtual scene based on the reference put position, and putting the target virtual resource at the target put position in the first virtual scene.

2. The method of claim 1, wherein the second virtual scene has a scene layout corresponding to the first virtual scene.

3. The method of claim 1, wherein the second virtual scene comprises a second scene element configured to characterize a first scene element in the first virtual scene, and a position of the second scene element in the second virtual scene is configured to characterize a position of the first scene element in the first virtual scene.

4. The method of claim 1, further comprising:

determining a display range of the second virtual scene in the graphical user interface based on a position of the resource indicator in the second virtual scene.

5. The method of claim 1, further comprising:

determining an initial display range of the second virtual scene in the graphical user interface, based on a position or orientation of the virtual object in the first virtual scene on occurrence of the enable trigger operation.

6. The method of claim 1, further comprising:

determining an initial position of the resource indicator in the second virtual scene, based on a position or orientation of the virtual object in the first virtual scene on occurrence of the enable trigger operation.

7. The method of claim 1, wherein the displaying of the second virtual scene by the graphical user interface comprises:

hiding the first virtual scene in the graphical user interface to trigger display of the second virtual scene in the graphical user interface.

8. The method of claim 1, wherein the second virtual scene comprises the first virtual scene with a preset virtual object hidden, and the preset virtual object comprises one or more of a player virtual character, a non-player virtual character, and/or a virtual prop object.

9. The method of claim 1, wherein the displaying of the second virtual scene by the graphical user interface comprises:

determining, in the graphical user interface displaying the first virtual scene, a second display area of an area range smaller than that of the graphical user interface; and displaying the second virtual scene by the second display area.

10. The method of claim 1, wherein the graphical user interface displaying the second virtual scene comprises movement control elements for controlling the resource indicator to move in the second virtual scene, and the movement control elements comprise a horizontal movement control element and a vertical movement control element, and the controlling of the resource indicator to move in the second virtual scene in response to the movement operation for the resource indicator comprises:

controlling the resource indicator to move in a horizontal direction in the second virtual scene, in response to a first touch operation on the horizontal movement control element; and controlling the resource indicator to move in a vertical direction in the second virtual scene, in response to a second touch operation on the vertical movement control element.

11. The method of claim 1, wherein the movement operation comprises a drag operation, and the controlling of the resource indicator to move in the second virtual scene in response to the movement operation for the resource indicator comprises:

controlling the resource indicator to move in the second virtual scene, in response to the drag operation for the resource indicator in the second virtual scene.

12. The method of claim 1, further comprising: after the controlling of the resource indicator to move in the second virtual scene in response to the movement operation for the resource indicator, displaying a transition clip comprising the second virtual scene that transforms as the resource indicator moves.

13. The method of claim 1, wherein the resource indicator comprises a reference put point, and a simulated enable shape for simulating a rendered shape of the target virtual resource enabled on a basis of the reference put point when the target virtual resource is at a respective position in the first virtual scene, and wherein the determining of the reference put position of the resource indicator in the second virtual scene, in response to the position confirmation instruction for the resource indicator, comprises:

obtaining a spatial layout of the second virtual scene during movement of the resource indicator;

determining a rendering range of the simulated enable shape of the resource indicator based on the spatial layout of the second virtual scene;

obtaining a reference rendering range of the simulated enable shape, and a height and ground projection coordinates of the reference put point in the second virtual scene, in response to the position confirmation instruction for the resource indicator;

determining a position of the reference put point in the second virtual scene based on the height and the ground projection coordinates; and determining the reference put position of the resource indicator in the second virtual scene, based on the position of the reference put point in the second virtual scene and the reference rendering range of the simulated enable shape.

14. The method of claim 13, wherein the determining of the rendering range of the simulated enable shape of the resource indicator based on the spatial layout of the second virtual scene comprises:

determining the rendering range of the simulated enable shape of the resource indicator based on a number of puts of the target virtual resource and the spatial layout of the second virtual scene.

15. The method of claim 13, wherein the target virtual resource comprises a target put point, and a target enable shape that comprises a rendering shape of the target virtual resource enabled at the target put point, and the determining of the target put position for the target virtual resource in the first virtual scene based on the reference put position comprises:

obtaining spatial position correspondence between the first virtual scene and the second virtual scene;

determining a position corresponding to the reference put point in the first virtual scene based on the reference put position and the spatial position correspondence, as the target put point;

determining a rendering range corresponding to the simulated enable shape in the first virtual scene based on the reference put position and the spatial position correspondence, as a target rendering range of the target enable shape; and determining the target put position for the target virtual resource in the first virtual scene based on the target put point and the target rendering range.

16. The method of claim 1, further comprising:

displaying a prop cancellation area in response to the enable trigger operation for the target virtual resource; and displaying the first virtual scene in response to a trigger operation on the prop cancellation area.

17. The method of claim 1, wherein the graphical user interface displaying the first virtual scene comprises an attack control element for instructing the virtual object to launch an attack in the first virtual scene, and the method further comprises: before the determining of the reference put position of the resource indicator in the second virtual scene in response to the position confirmation instruction for the resource indicator, converting the attack control element into a position determination control element for the resource indicator; and generating the position confirmation instruction for the resource indicator in response to a touch operation on the position determination control element.

18. A computer device, comprising:

a processor; and a memory storing a computer program;

executable by the processor to perform a method for controlling put of a virtual resource, wherein the method comprises:

displaying a first virtual scene and a virtual object located in the first virtual scene by a graphical user interface, wherein the virtual object is configured to perform a game behavior in response to a touch operation on the graphical user interface;

displaying a second virtual scene and a resource indicator located in the second virtual scene by the graphical user interface, in response to an enable trigger operation for a target virtual resource, wherein the resource indicator is configured to visually indicate a put position for the target virtual resource;

controlling the resource indicator to move in the second virtual scene, in response to a movement operation for the resource indicator;

determining a reference put position of the resource indicator in the second virtual scene, in response to a position confirmation instruction for the resource indicator; and determining a target put position for the target virtual resource in the first virtual scene based on the reference put position, and putting the target virtual resource at the target put position in the first virtual scene.

19. A non-transitory storage medium storing a computer program executable by a processor to perform a method for controlling put of a virtual resource, wherein the method comprises:

displaying a first virtual scene and a virtual object located in the first virtual scene by a graphical user interface, wherein the virtual object is configured to perform a game behavior in response to a touch operation on the graphical user interface;

displaying a second virtual scene and a resource indicator located in the second virtual scene by the graphical user interface, in response to an enable trigger operation for a target virtual resource, wherein the resource indicator is configured to visually indicate a put position for the target virtual resource;

controlling the resource indicator to move in the second virtual scene, in response to a movement operation for the resource indicator;

determining a reference put position of the resource indicator in the second virtual scene, in response to a position confirmation instruction for the resource indicator; and determining a target put position for the target virtual resource in the first virtual scene based on the reference put position, and putting the target virtual resource at the target put position in the first virtual scene.

20. The method of claim 1, wherein the graphical user interface displaying the first virtual scene comprises the virtual object located in the first virtual scene, and the graphical user interface displaying the second virtual scene comprises no virtual object located in the second virtual scene.

* * * * *